June 4, 1940.  I. T. KEMPE  2,203,435

CABLE LAYER

Filed Feb. 3, 1937  3 Sheets-Sheet 1

Inventor:—
Irwin T. Kempe,
By: Smith, Michael & Gardiner,
Attorneys.

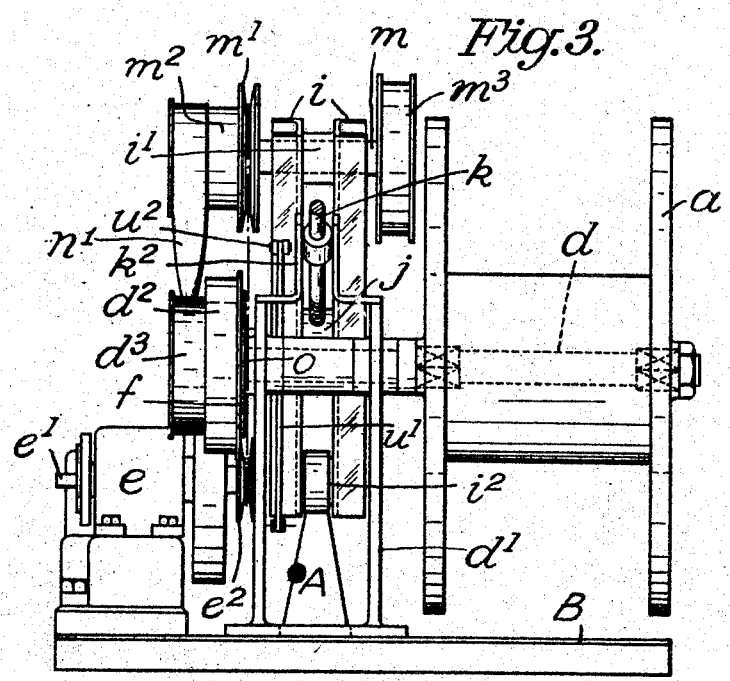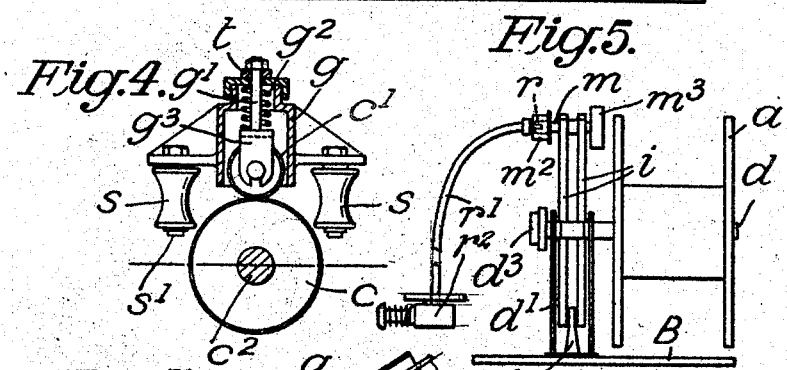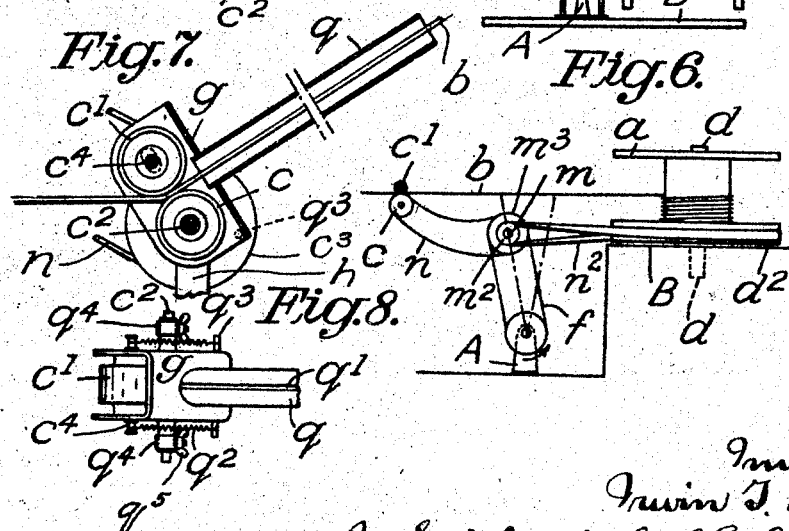

Patented June 4, 1940

2,203,435

UNITED STATES PATENT OFFICE 2,203,435

CABLE LAYER

Irwin Trevanion Kempe, Longparish, Andover, England

Application February 3, 1937, Serial No. 123,939
In Great Britain February 5, 1936

12 Claims. (Cl. 242—54)

This invention relates to apparatus for temporarily laying electric cables such as telephone wires or cables and substantially recovering such laid cables, and it is especially applicable for use in military exercises or operations where telephone cables have to be laid on the ground or supported on hedges or the like.

An object of the invention is to provide in a cable laying apparatus, a simple transmission device whereby either the means for paying out the cable can be operated or a storage drum for the cable can be rotated to reel-in the cable.

Another object of the invention is to provide an assembly for rapidly paying out the cable from a drum mounted on a transportable base or carrier, which may be operated from any suitable transport vehicle, through feed rolls on to a hedge or the like or down to the ground, or rapidly reeling it back to the drum, the feed rolls or the drum being driven from a source of power carried by the base or the vehicle.

A further object is the provision of selective transmission devices mounted on the vehicle whereby either the feed rolls can be rotated for mechanically paying out the cable, or the drum can be revolved for mechanically reeling in the cable, said paying out or reeling in operation being effected by a common source of power. The transmission devices are driven direct from the power unit of said vehicle or from an independent motor or by hand. Preferably the transmission devices are located intermediate of the feed rolls and the drum.

By means of this invention, the cable drawn from a rotatable storage drum upon a vehicle can be mechanically directed to the destination of the cable, which can thus be deposited under, over or on top of a hedge, wall or the like and afterwards recovered by reeling it in to said drum.

Figure 1:
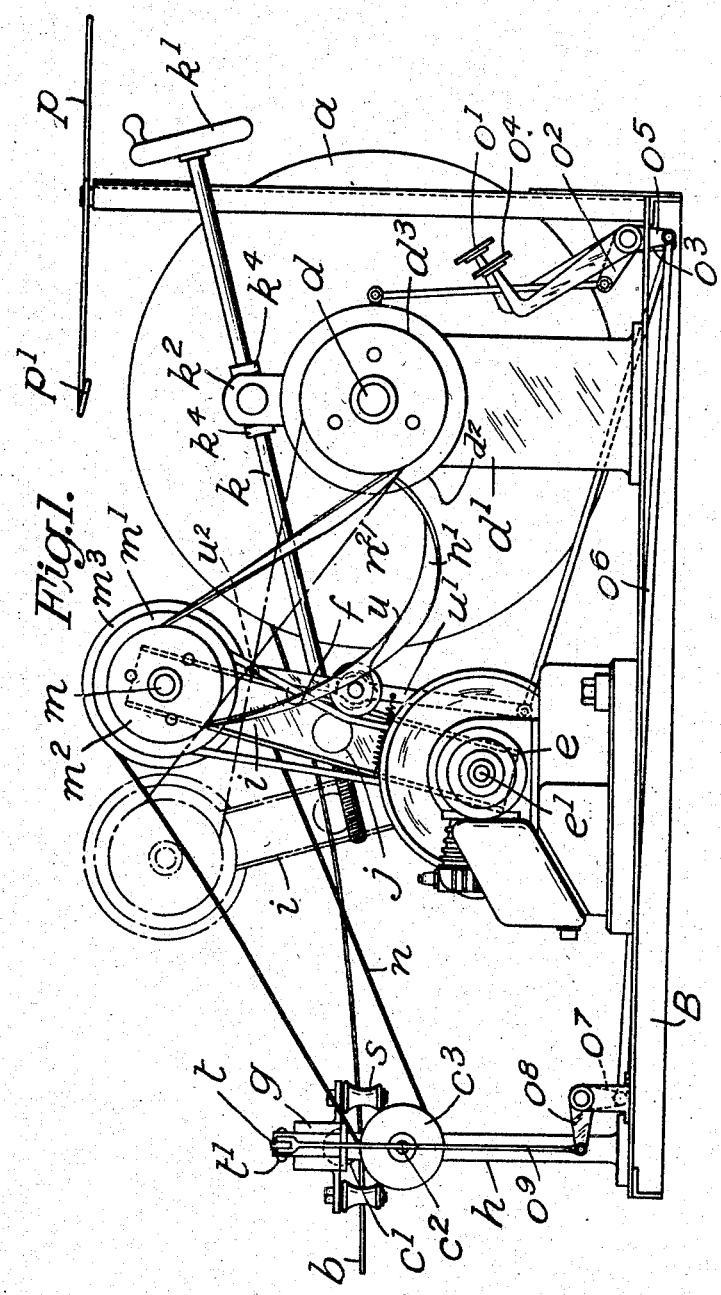

The invention is hereafter described with reference to the annexed drawings, in which: Fig. 1 is a front elevation, Fig. 2 a plan view and Fig. 3 an end elevation (some parts being removed) of one form of the apparatus with a cable drum horizontally mounted. Fig. 4 is an elevation on a larger scale of the feed-roll device of Fig. 1. Fig. 5 is a diagram showing a coupling between a rotatable countershaft and a power-operated flexible shaft. Fig. 6 is a diagram showing the cable drum mounted on a vertical axis. Fig. 7 is a sectional elevation of a directive casing for the cable and Fig. 8 is a plan view of part of Fig. 7.

Figure 2:
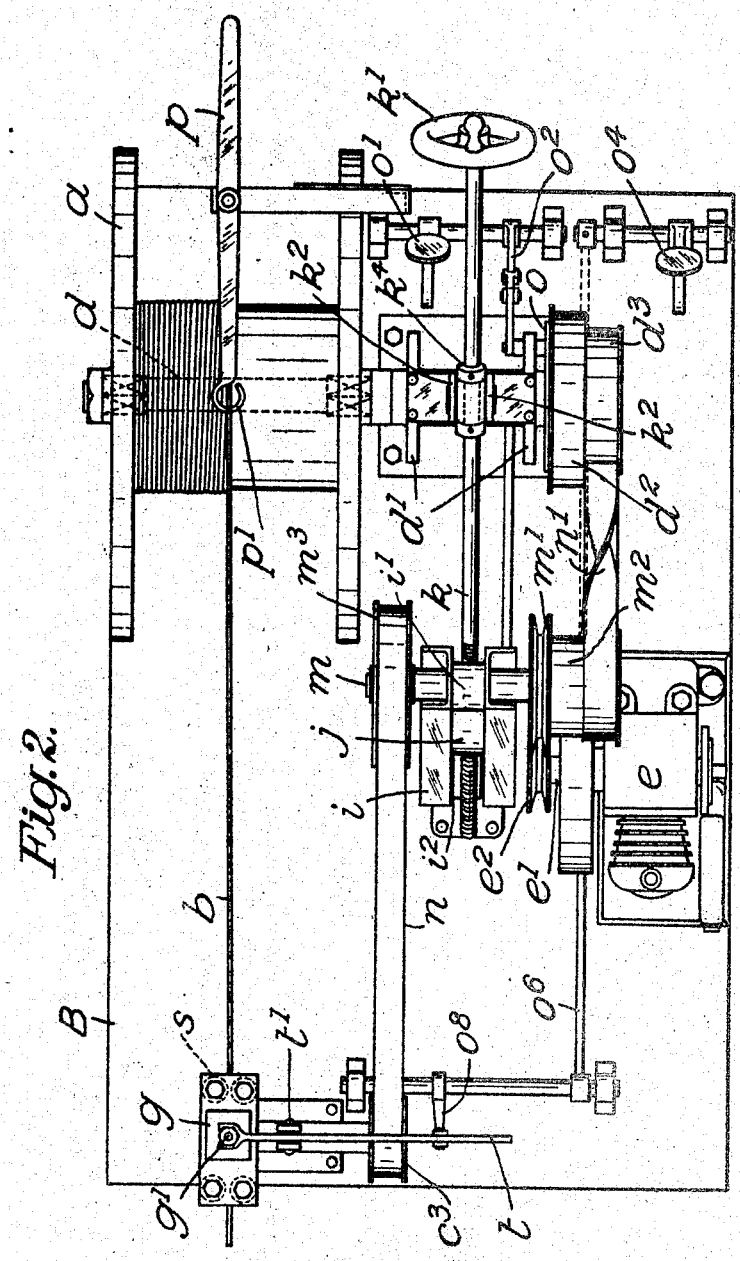

In these drawings, I have indicated the cable drum at $a$, the cable by $b$, and the feed-rolls by $c$, $c^1$. In Figs. 1, 2 and 3, the drum $a$ is shown mounted on a horizontal spindle $d$ journaled in uprights $d^1$, $d^1$ upstanding from the base B. The drum $a$ rotates with spindle $d$. A small internal combustion engine is indicated at $e$ having a crankshaft $e^1$ on which is mounted a pulley $e^2$ driving a first-motion belt $f$. The feed-rolls are shown mounted on a pillar $h$ also upstanding from base B. The upper roller $c^1$ is housed in a casing $g$ and is spring-pressed towards the lower roller $c$, and the latter is adapted to be rotated in the manner hereafter described.

Upon the same axis as that of the crankshaft $e^1$, I pivot a beam $i$ which as shown in Fig. 1, can be displaced and inclined to either side of the vertical. In Fig. 3 this beam $i$ is shown pivoted at $i^2$ near its lower end in a bracket A mounted on the base B. This beam may be formed from two channel section girders (see Figs. 2 and 3) placed back to back and it carries between the girders a socket or traveller $j$ forming a nut which is engaged by a screwed spindle $k$ fitted with a hand-wheel $k^1$ and suitably journaled in a bracket as $k^2$ supported by the uprights $d^1$ upon the machine. The spindle $k$ is provided with collars $k^4$ to keep it in position relatively to the travelling nut $j$. By rotating the wheel $k^1$ the beam $i$ can be moved from one inclined position to another, without altering the desired tension of the belt drive from the engine $e$.

A spring-pulled jockey pulley $u$ mounted on a link $u^1$ pivoted at $u^3$ to the beam $i$, which link is connected with a pedal $o^1$ hereafter mentioned, normally maintains the driving tension of the first-motion driving belt $f$, as seen in Fig. 1.

From the belt pulley $e^2$ the belt $f$ passes to a pulley $m^1$ upon a rotatable control shaft or countershaft $m$ mounted in a tubular housing $i^1$ upon and across the upper end of the beam $i$ and displaceable with the latter. This countershaft also carries a belt drum $m^2$ at the end adjacent to the pulley $m^1$ and at the other end a belt pulley $m^3$. Feed roll $c$ is provided with a shaft $c^2$ on which is carried a belt pulley $c^3$. This pulley $c^3$ is aligned with belt pulley $m^3$ on the countershaft $m$ and by means of a belt $n$, acting as a second motion drive, the roll $c$ can be rotated from countershaft $m$. The pressure roll $c^1$ is rotated by reason of its springs holding it towards the travelling cable.

The spindle $d$ for the cable drum $a$ is shown provided with two pulleys $d^2$, $d^3$ aligned with the belt drum $m^2$ and by means of another second-motion driving belt, shown in slack condition at $n^1$ but becoming tensioned as shown at $n^2$ when the beam $i$ is rocked over to the left hand side of its vertical position (as shown in chain lines in Fig. 1), the spindle $d$ and the cable drum $a$ can be rotated at a slow speed or a faster speed, according to which pulley $d^2$, $d^3$ is engaged by the said other second-motion belt; in this position, the belt $n$ will become slack, leaving the feed rolls $c$, $c^1$ free to revolve as the cable is wound upon the storage drum.

The pulley $d^2$ is provided with internal expanding brakes of the known kind indicated conventionally at $o$ to slow the movement of cable-drum $a$ when necessary and eventually to stop it. A brake pedal $o^1$ serves to apply the brake device $o$ by means of arm $o^2$ of bell crank lever $o^2$, $o^3$ and in a preliminary movement the arm $o^3$ of that bell crank removes the jockey pulley $u$ from its tensioning position against belt $f$. Further movement of pedal $o^1$ applies the brake $o$. A second pedal $o^4$ serves to separate the upper pressure roll $c$ by raising roll $c^1$ from the lower or driving roll $c$ by raising roll $c^1$ against the action of its spring. This is effected from pedal $o^4$ by crank arm $o^5$ and link $o^6$ pivoted to crank $o^7$, crank $o^8$, link $o^9$ to lever $t$. This lever $t$ is pivoted intermediately of its length at $t^1$ on the pillar $h$ so that as link $o^9$ draws down that end of the lever $t$, the other end of lever $t$ which is forked above the casing $g$ (see Fig. 4) lifts the spindle $g^1$ on which is mounted the spring $g^2$ bearing on a fork arm $g^3$ carrying the roll $c^1$.

Instead of the pressure roll $c^1$ being lifted by the pedal $o^4$ it may be raised by hand by depressing the free end of the lever $t$ as in the plan view, Fig. 2.

The cable $b$ is drawn from storage drum $a$ by the feed rolls $c$, $c^1$ and is delivered or laid where required, being paid out behind from the apparatus carried by an advancing vehicle. In this operation the drum $a$ rotates freely and the feed roll $c$ is driven by belt $n$ from control shaft $m$.

As the cable passes from between those rolls, it may, if desired, be caused to travel through a directive casing $q$. This casing (see Figs. 7 and 8) is formed as a cylinder $q$ with a longitudinal slot $q^1$ for the insertion of the cable and it is adjustable for height and inclination. As shown, it is formed as a tubular projection $q$ from the casing $g$, the rolls $c$, $c^1$ being in this example faced with rubber and held together by coiled springs $q^2$, $q^2$ secured to pins $q^3$, $q^3$ on casing $g$ and engaging the spindle $c^4$ of the upper or pressure roll to pull the latter towards the lower or driven roll $c$. The pillar $h$ supports the casing $g$ by means of trunnions $q^4$ with locking devices which may be in the form of clamps or wing nuts $q^5$ to allow the angular elevation or inclination of the tubular projection $q$ to be changed by adjusting the casing $g$ angularly around the axis of the shaft $c^3$ as desired and then fixed.

When the temporarily laid cable $b$ is to be reeled in on the drum $a$, the beam $i$ is displaced from the position shown in full lines in Fig. 1 to the position there shown in dotted lines, and the pulley $d^2$ (or $d^3$, according to the speed desired) is driven from belt drum $m^2$ by means of the other second-motion belt $n^2$. The feed rolls $c$, $c^1$ are now free to rotate as the cable is drawn through them when the drum $a$ is revolved. The arm $p$ with guiding loop $p^1$ is controlled by an operator so that the cable $b$ is neatly and compactly wound on the storage drum, being coiled from one side to the other of the latter and back again.

By means of the hand wheel $k^1$, spindle $k$ and nut $j$, the tension of the belt $n$ or $n^2$ can be increased or slackened, as desired. In this way, the speed of the cable drum can be varied from a maximum down to zero. Because the beam $i$ is pivoted on the same axis as the belt pulley $e^2$ on the independent motor $e$, the position of the beam $i$ does not affect the first motion belt drive from motor $e$ to the control shaft or countershaft $m$. With advantage, this belt drive from pulley $e^2$ to countershaft $m$ is by a V-section belt running in V-grooved pulleys. The belts $n$ and $n^2$ are each shown as a flat belt.

Where an independent motor (i. e., one not connected with the propulsion of a vehicle) is employed the following advantages are obtained:
(1) The cable-laying apparatus can be quickly transferred to and operated from any form of transport vehicle. (2) Reeling-in the cable on to a drum mounted on a stationary vehicle presents no difficulties. (3) When the apparatus is dismounted from a vehicle and placed in any convenient position, it permits the cable to be reeled or unreeled readily either for inspection or for repair.

In the arrangement shown in Fig. 4, the casing $g$ not only houses the upper or spring-urged pressure roll $c^1$ but also carries rolls $s$ suitably mounted on vertical spindles $s^1$, these spindles being at right angles to those of the horizontal rolls. These vertical rolls $s$ are located in pairs on opposite sides of the cable $b$ as it passes between the rolls $c$, $c^1$ and they serve to guide the travelling cable.

By temporarily removing one pair of these rolls $s$, the cable $b$ can be easily introduced sideways between the rolls $c$ and $c^1$.

Instead of providing the motor $e$, I may drive the control shaft $m$ by a flexible shaft from another source of power. Thus, see Fig. 5, I may provide a coupling $r$ between the shaft $m$ and a flexible shaft $r^1$ which latter is driven from a suitable source of power $r^2$.

Drum $a$ in Fig. 1 is supported on a horizontal spindle $d$ but it is possible to mount the drum $a$ upon a vertical axis or spindle. Fig. 6 illustrates this arrangement, in which the drum $a$ is mounted upon a vertical spindle $d$, and the second motion belt $n^2$ from drum $m^2$ to pulley $d^2$ on spindle $d$ is given a quarter-twist, the base B preventing this belt from falling off the pulley $d^2$ when it is slackened and the belt $n$ is tightened for paying out the cable from the drum. The vertical spindle $d$ is suitably secured in the base B of the apparatus.

As stated above, the cable $b$ can be delivered behind an advancing vehicle, for example directly in its wake; alternatively, the cable can be paid out from the side of the vehicle, the drum-spindle being conveniently set approximately in the line of travel of the vehicle. When the cable is to be reeled-in, the vehicle can be driven forwards parallel to the line of cable, the latter being picked up at the rear of the vehicle by means of a bight in the cable, and the length of the bight being regulated by adapting the speed of the vehicle to the speed of the drum, or vice versa. If only a short length of cable has been laid, it could be reeled in while the vehicle is stationary.

In addition to laying electric cables or telegraph or telephone wires temporarily as for military signalling purposes, the present invention can be employed for other objects such for example, as laying cables temporarily between a power-station and an electrically-operated ploughing tractor for use by farmers, or between a power-station and electrical pumps where used by a fire-brigade.

What I claim is:

1. A transportable wire laying and recovery device comprising a rotatable wire-storage drum, wire-feeding rolls, transmission means including alternatively operative drives to said drum and to said rolls, means for bringing a selected one of said drives into operation, and a source of power, said transmission means being connected with said source of power and being adapted by operation of the selected one of said drives to rotate either the said feed-rolls for wire laying or the said wire-storage drum for recovery of a laid wire.

2. A cable laying and recovery device comprising a transportable base, a rotatable cable-storage drum, a pair of cable-feeding rolls, transmission devices including alternatively operative driving connections to said drum and to said rolls, and means for rendering either of said connections operative, all said drum, rolls and transmission devices being mounted on said base, and said transmission devices being located intermediately of said rolls and said drum, and a source of power for driving said transmission devices, so that either said drum or said rolls can be selectively rotated by the power of said source.

3. A cable laying and recovery device comprising a transportable base, a rotatable cable-storage drum, a pair of cable-feeding rolls, transmission devices including alternatively operative drives to said drum and to said rolls, and a source of power for said transmission devices, said drum, rolls, transmission devices and source of power being supported upon said base, and means for rendering one of said drives operative for rotating from said source of power through said transmission devices either said rolls for feeding out cable in wire laying or said drum for recovery of a laid wire.

4. Cable laying apparatus comprising a transportable base, a rotatable cable-storage drum, a pair of cable-feeding rolls and transmission devices including alternatively operative drives to said drum and to said rolls, all said drum, rolls and transmission devices being mounted on said base, and a source of power, said transmission devices including a beam pivotally mounted at its lower end for angular setting in either of two positions and a rotatable counter-shaft supported at the upper end of said beam, said counter-shaft being driven by said source of power and operating to rotate either said drum or said rolls according to the angular position in which said beam is set.

5. Cable laying apparatus comprising a movable carrier, a cable drum rotatably supported on said carrier, a set of cable feeding rolls also supported on said carrier, said rolls including a spring-pressed upper roll and a co-operating lower roll, a guide supported by said carrier for guiding said cable from said set of rolls on to said drum, a rotatable countershaft supported upon said carrier, said countershaft being located intermediately of said rolls and cable drum and being operatively connected with a source of power, and means for selectively rotating said co-operating roll or said cable drum through said countershaft.

6. A cable laying and recovery device comprising a transportable carrier, a rotatable cable-drum mounted on said carrier, a set of cable-feeding rolls mounted on said carrier, a source of power located upon said carrier, a rotatable countershaft also supported upon said carrier, means for rotating said countershaft from said source of power, means for rotating said feed rolls from said countershaft to pay out the cable from said drum through said rolls, means for rotating said drum from said countershaft to reel in the cable passing through said rolls, and manually controlled means for bringing either one of said rotating means into operation.

7. A cable laying and recovery device comprising a transportable carrier, a rotatable cable-drum mounted on said carrier, a set of cable-feeding rolls mounted on said carrier, a source of power located upon said carrier, a rotatable countershaft also supported upon said carrier, means for rotating said countershaft from said source of power, means for rotating said feed rolls from said countershaft to pay out cable from said drum through said rolls, means for rotating said drum from said countershaft to reel in a laid cable passing between said rolls, and means for confining the drive from said countershaft to one only of said drum and said rolls by displacement of said countershaft in relation to said drum and said rolls.

8. A cable layer adapted to be mounted on a vehicle and to pay out cable from a cable-drum and also to reel in a laid cable on to a cable drum, comprising a carrier, a cable-drum support on said carrier, the cable-drum being rotatably mounted on said support, a casing mounted on said carrier, feed-rolls journaled in said casing, a source of power upon said carrier, a rotatable countershaft supported on said carrier and connected for rotation by said source of power, means for selectively driving either of said drum and said feed-rolls from said countershaft whilst allowing the other to revolve freely, means for braking the rotation of said drum, and a hand-operated device for controlling said selective driving means.

9. A cable layer adapted to be mounted on a vehicle for temporarily laying a cable, comprising a carrier, a cable drum rotatably mounted on said carrier, a rotatable countershaft supported upon said carrier, means for rotating said drum from said countershaft, means for braking the rotatory movement of said drum, co-operating feed rolls supported upon said vehicle, said feed-rolls arranged for the cable to pass between them, means for rotating one of said feed-rolls from said countershaft, and means for selectively operating either the said drum-rotating means or the said roll-rotating means from said countershaft whilst allowing the other of said rotating means to rotate freely.

10. Transportable apparatus for temporarily laying electric cables and for recovery of laid cables, comprising a carrier, a rotatable cable-drum carried by said carrier, rotatable cable-feed rolls, said rolls being held towards one another by spring pressure and being supported on said carrier, a beam pivoted at one end and located in an approximately vertical position intermediate of said drum and said feed rolls, a rotatable counter shaft carried at the other end of said beam, said counter shaft forming a power-transmission member common to said drum and said feed rolls, means for displacing said beam from one side to the other of the vertical, means for driving either said feed rolls or said cable-drum from said countershaft, a motor adapted to drive said countershaft, and a driving connection between said motor and said countershaft, said motor being located with its driving shaft coaxial with the pivotal mounting of said beam.

11. A cable laying and recovery apparatus, comprising a base, rotatable feed rolls for paying out a cable and a single rotatable drum for storage of said cable, one of said rolls being spring-pressed towards another of said rolls co-operating therewith, a tilting beam pivotally mounted at its lower end on said base, a countershaft carried by the upper end of said beam, said countershaft forming a power-transmission member common to said feed rolls and said drum, means for displacing said tilting beam to either side of the vertical, a motor also mounted on said base and including a driving shaft coaxial with the pivot of said tilting beam, a first-motion drive from said driving shaft to said countershaft and second-motion drives from said countershaft to said co-operating feed roll and to said storage drum, said second motion drives being operated selectively by displacement of said tilting beam for laying cable from said drum or for recovery of cable on to said drum respectively.

12. A transportable reeling device, comprising a rotatable storage drum, guide rolls, a source of power, and alternatively operative means for rotating by the power of said source either said storage drum to reel in material over said guide rolls or said guide rolls to roll out material from said storage drum, said rotating means being operable during transportation of said reeling device.

IRWIN TREVANION KEMPE.